US011900857B2

(12) United States Patent
Lee et al.

(10) Patent No.: US 11,900,857 B2
(45) Date of Patent: Feb. 13, 2024

(54) DATA TRANSMISSION/RECEPTION CIRCUIT AND DISPLAY DEVICE INCLUDING THE SAME

(71) Applicant: LG DISPLAY CO., LTD., Seoul (KR)

(72) Inventors: Byung Jae Lee, Seoul (KR); A Rom So, Seoul (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 17/966,941

(22) Filed: Oct. 17, 2022

(65) Prior Publication Data

US 2023/0215338 A1 Jul. 6, 2023

(30) Foreign Application Priority Data

Dec. 31, 2021 (KR) ........................ 10-2021-0194567

(51) Int. Cl.

*G09G 3/32* (2016.01)
*G09G 3/20* (2006.01)
*G09G 3/3275* (2016.01)

(52) U.S. Cl.

CPC ............. *G09G 3/2096* (2013.01); *G09G 3/32* (2013.01); *G09G 3/3275* (2013.01); *G09G 2310/0291* (2013.01); *G09G 2370/08* (2013.01)

(58) Field of Classification Search

CPC ...... G09G 5/00; G09G 3/3275; G09G 3/2096; G09G 3/32; G09G 2310/0291; G09G 2370/08; G06F 3/041; G06F 3/044

See application file for complete search history.

(56) References Cited

U.S. PATENT DOCUMENTS

2005/0264691 A1 12/2005 Endo et al.
2019/0371249 A1* 12/2019 Takahashi ............ G09G 3/3275
2020/0388242 A1* 12/2020 Chang ...................... G09G 3/20
2021/0335275 A1* 10/2021 Park ..................... G09G 3/3275
2021/0350756 A1* 11/2021 Sun .......................... G09G 3/36
2022/0114983 A1* 4/2022 Lee .......................... G09G 3/36

FOREIGN PATENT DOCUMENTS

EP 0368572 A2 5/1990
JP 2002-278528 A 9/2002
WO 2009/030169 A1 3/2009

OTHER PUBLICATIONS

UK Search and Examination Report dated Mar. 17, 2023 issued in Patent Application No. 2214057.8 (6 pages).
GB Office Action dated Dec. 6, 2023 issued in Patent Application No. GB2214057.8 (5 pages).

* cited by examiner

*Primary Examiner* — Michael A Faragalla
(74) *Attorney, Agent, or Firm* — POLSINELLI PC

(57) ABSTRACT

A display device includes a display panel configured to display an image, a timing controller configured to control the display panel, a memory operating in association with the timing controller, and a data transmission/reception circuit configured to write data to the memory or to read data from the memory under the control of the timing controller, wherein the data transmission/reception circuit includes a transmission direction setting unit configured to set a data transmission/reception path depending on a data transmission period or a data reception period in order to avoid collision between input and output during data transmission/reception.

4 Claims, 13 Drawing Sheets

FIG. 10
REQ
REQ
REQ
CLK
RST
CMD
D0
D1
D2
D3
D4
D5
D6
D7
DMY
REQ
REQ
CMD
D0
D1
D2
D3
D4
D5
D6
D7
DMY

< Protocol 1 : 120 -> 170 >

< Protocol 2 : 170 -> 120 >

[Symbol]

| En | Input | Output |
|---|---|---|
| 0 | X | Hi-Z |
| 1 | 0 | 0 |
| 1 | 1 | 1 |

[Truth Table]

DATA TRANSMISSION/RECEPTION CIRCUIT AND DISPLAY DEVICE INCLUDING THE SAME

CROSS-REFERENCE TO RELATED APPLICATION

This application claims the priority of Korean Patent Application No. 10-2021-0194567, filed on Dec. 31, 2021, which is hereby incorporated by reference in its entirety.

BACKGROUND

Field of the Disclosure

The present disclosure relates to a data transmission/reception circuit and a display device including the same.

Description of the Background

With the development of information technology, the market for display devices, which are connection media between users and information, is growing. Accordingly, display devices such as a light emitting display (LED) device, a quantum dot display (QOD) device, and a liquid crystal display (LCD) device are increasingly used.

The display devices described above include a display panel including sub-pixels, a driver outputting a driving signal for driving the display panel, a power supply generating power to be supplied to the display panel or the driver, and the like.

In the aforementioned display devices, when driving signals, for example, a scan signal and a data signal, are supplied to the sub-pixels formed in the display panel, selected sub-pixels transmit light or directly emit light, thereby displaying an image.

SUMMARY

Accordingly, the present disclosure is to provide a device capable of allowing long-range data transmission/reception between a timing controller and a memory and stable communication to increase a degree of freedom at the time of assembling and modularizing the device and to overcome the inconvenience of having to replace the memory adjacent to the timing controller in case of failure of the timing controller.

To achieve these and other advantages and in accordance with the present disclosure, as embodied and broadly described herein, a display device includes a display panel configured to display an image, a timing controller configured to control the display panel, a memory operating in association with the timing controller, and a data transmission/reception circuit configured to write data to the memory or to read data from the memory under the control of the timing controller, wherein the data transmission/reception circuit includes a transmission direction setting unit configured to set a data transmission/reception path depending on a data transmission period or a data reception period in order to avoid collision between input and output during data transmission/reception.

The transmission direction setting unit may include a plurality of tri-state buffers and set the transmission/reception path according to logic states of enable signals applied to enable terminals of the plurality of tri-state buffers.

The plurality of tri-state buffers may include a data transmission tri-state buffer enabled when data is transmitted, and a data reception tri-state buffer enabled when data is received.

The data transmission/reception circuit may include a first interface configured to operate to transmit a data signal transmitted from the timing controller to the memory, and a second interface configured to operate to transmit a data signal transmitted from the memory to the timing controller, wherein the enable signal may be output from one of the first interface and the second interface.

The data transmission/reception circuit may include a first data format converter configured to receive signals transmitted from the timing controller, to convert a serial data signal from among the signals transmitted from the timing controller into a parallel data signal, and to output the parallel data signal, and a second data format converter configured to receive signals transmitted from the memory, to convert a parallel data signal from among the signals transmitted from the memory into a serial data signal, and to output the serial data signal.

The second data format converter may convert the parallel data signal into the serial data signal based on a clock signal output from the first data format converter.

The timing controller and the data transmission/reception circuit may perform clock training when irregular operations including a read operation, a write operation, and an erase operation of the memory are performed.

The display device may further include a first communication line positioned between the timing controller and the data transmission/reception circuit, and a second communication line positioned between the data transmission/reception circuit and the memory, wherein the first communication line may be selected as a differential signal line capable of allowing long-range data transmission and reception.

In another aspect of the present disclosure, a data transmission/reception circuit includes a first data format converter configured to receive signals transmitted from a first external device, to convert a serial data signal from among the signals transmitted from the first external device into a parallel data signal, and to output the parallel data signal, a second data format converter configured to receive signals transmitted from a second external device, to convert a parallel data signal from among the signals transmitted from the second external device into a serial data signal, and to output the serial data signal, a first interface configured to operate to transmit a data signal transmitted from the first external device to the second external device, a second interface configured to operate to transmit a data signal transmitted from the second external device to the first external device, and a transmission direction setting unit configured to set a data transmission/reception path depending on a data transmission period or a data reception period in order to avoid collision between input and output during data transmission/reception between the first external device and the second external device.

The transmission direction setting unit may include a plurality of tri-state buffers and set the data transmission/reception path according to logic states of enable signals applied to enable terminals of the plurality of tri-state buffers.

The plurality of tri-state buffers may include a data transmission tri-state buffer enabled when data is transmitted, and a data reception tri-state buffer enabled when data is received, and the enable signal may be output from one of the first interface and the second interface.

The second data format converter may convert the parallel data signal into the serial data signal based on a clock signal output from the first data format converter.

BRIEF DESCRIPTION OF THE DRAWINGS

The accompanying drawings, which are included to provide a further understanding of the disclosure and are incorporated in and constitute a part of the disclosure, illustrate aspects of the disclosure and together with the description serve to explain the principle of the disclosure.

In the drawings.

DETAILED DESCRIPTION

A display device according to the present disclosure may be implemented as a television, a video player, a personal computer (PC), a home theater, an automobile electric device, a smartphone, and the like, but the present disclosure is not limited thereto. The display device according to the present disclosure may be implemented as a light emitting display (LED) device, a quantum dot display (QOD) device, a liquid crystal display (LCD) device, or the like. However, for convenience of description, a light emitting display device that directly emits light based on inorganic light emitting diodes or organic light emitting diodes will be exemplified below.

Figure 1:
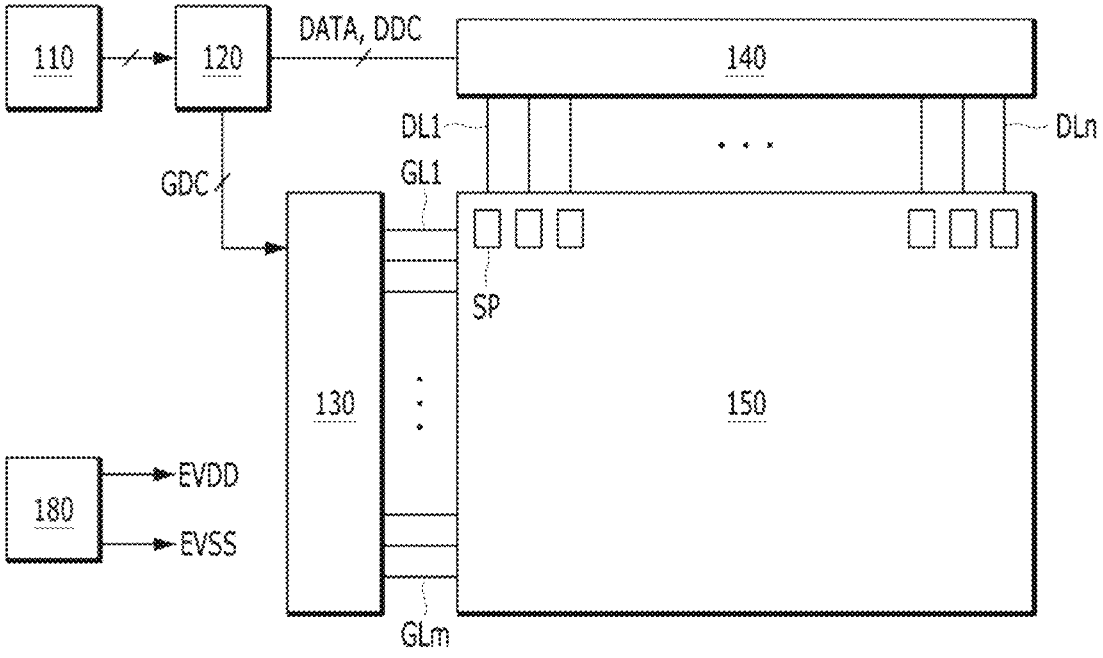
FIG. 1 is a block diagram schematically showing a light emitting display device.
Figure 2:
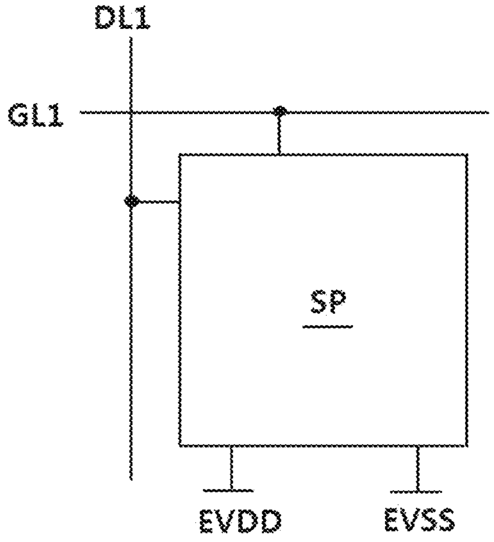
FIG. 2 is a configuration diagram schematically showing a sub-pixel illustrated in FIG. 1.

FIG. 1 is a block diagram schematically showing a light emitting display device, and FIG. 2 is a configuration diagram schematically showing a sub-pixel illustrated in FIG. 1.

As shown in FIGS. 1 and 2, the light emitting display device may include an image provider 110, a timing controller 120, a gate driver 130, a data driver 140, a display panel 150, a power supply 180, and the like.

The image provider (set or host system) 110 may output various driving signals along with an image data signal supplied from the outside or an image data signal stored in an internal memory. The image provider 110 may supply a data signal and various driving signals to the timing controller 120.

The timing controller 120 may output a gate timing control signal GDC for controlling the operation timing of the gate driver 130, a data timing control signal DDC for controlling the operation timing of the data driver 140, and various synchronization signals.

The timing controller 120 may supply a data signal DATA supplied from the image provider 110 along with the data timing control signal DDC to the data driver 140. The timing controller 120 may take the form of an integrated circuit (IC) and be mounted on a printed circuit board, but is not limited thereto.

The gate driver 130 may output a gate signal (or a gate voltage) in response to the gate timing control signal GDC supplied from the timing controller 120. The gate driver 130 may supply gate signals to sub-pixels included in the display panel 150 through gate lines GL1 to GLm. The gate driver 130 may be take the form of an IC or may be directly formed on the display panel 150 in a gate-in-panel structure, but is not limited thereto.

The data driver 140 may sample and latch the data signal DATA in response to the data timing control signal DDC supplied from the timing controller 120, convert the digital data signal into an analog data voltage based on a gamma reference voltage, and output the analog data voltage. The data driver 140 may supply a data voltage to the sub-pixels included in the display panel 150 through data lines DL1 to DLn. The data driver 140 may take form of an IC and be mounted on the display panel 150 or mounted on a printed circuit board, but is not limited thereto.

The power supply 180 may generate a high-level voltage and a low-level voltage based on external input power supplied from the outside, and output the same through a first power line EVDD and a second power line EVSS. The power supply 180 may generate and output voltages (e.g., gate voltages including a gate high voltage and a gate low voltage) necessary to drive the gate driver 130 and voltages (drain voltages including a drain voltage and a half drain voltage) necessary to drive the data driver 140 as well as the high-level voltage and the low-level voltage.

The display panel 150 may display an image in response to driving signals including a gate signal and a data voltage, driving voltages including the high-level voltage and the low-level voltage, and the like. The sub-pixels of the display panel 150 directly emit light. The display panel 150 may be manufactured based on a substrate having rigidity or flexibility, such as glass, silicon, polyimide, or the like. In addition, the sub-pixels that emit light may include red, green, and blue pixels or include red, green, blue, and white pixels.

For example, one sub-pixel SP may be connected to the first data line DL1, the first gate line GL1, the first power line EVDD, and the second power line EVSS and may include a pixel circuit including a switching transistor, a driving transistor, a capacitor, an organic light emitting diode, and the like. Since the sub-pixel SP used in the light emitting display device directly emits light, the circuit configuration is complicated. In addition, there are various compensation circuits for compensating for deterioration of a driving transistor for supplying a driving current necessary to drive organic light emitting diodes emitting light as well as the organic light emitting diodes. Accordingly, it is noted that the sub-pixel SP is simply illustrated in the form of a block.

Meanwhile, in the above description, the timing controller 120, the gate driver 130, the data driver 140, and the like are described as individual components. However, depending on the implementation method of the light emitting display device, one or more of the timing controller 120, the gate driver 130, and the data driver 140 may be integrated into one IC.

Figure 3:
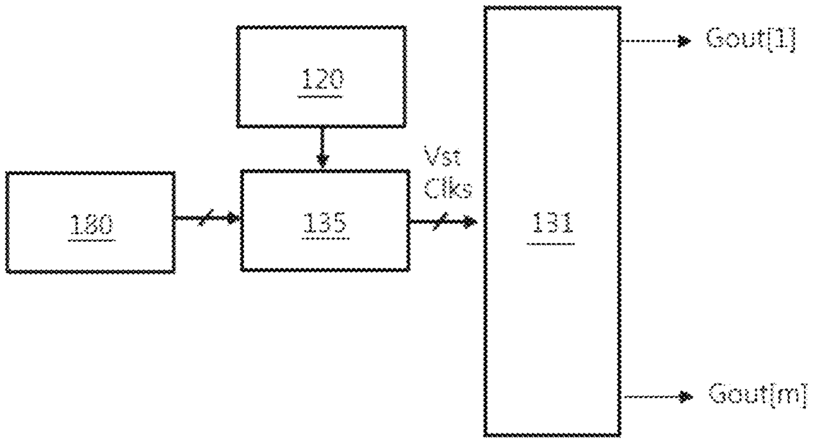
FIGS. 3 to 5 are diagrams for describing a configuration of a gate-in-panel type gate driver.
Figure 4:
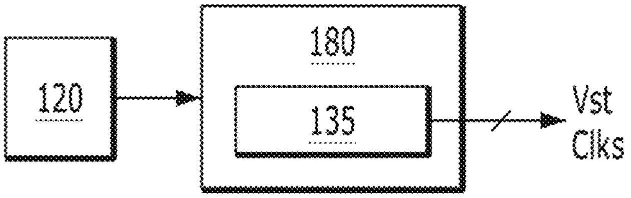
Figure 5:
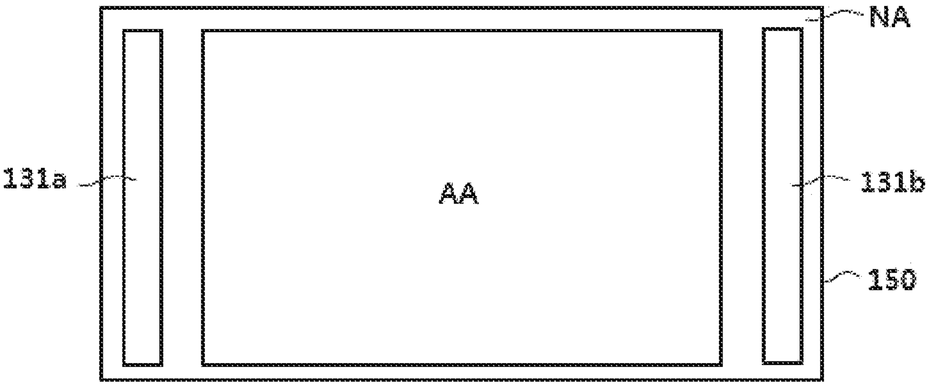

FIGS. 3 to 5 are diagrams for describing a configuration of a gate-in-panel type gate driver.

As shown in FIG. 3, the gate-in-panel type gate driver 130 may include a shift register 131 and a level shifter 135. The level shifter 135 may generate clock signals Clks and a start signal Vst based on signals and voltages output from the timing controller 120 and the power supply 180. The clock signals Clks may be generated in the form of J different phases (J being an integer equal to or greater than 2) such as 2 phases, 4 phases, or 8 phases. The shift register 131 may output gate signals Gout[1] to Gout[m] based on the clock signals Clks and the start signal Vst output from the level shifter 135.

As shown in FIGS. 3 and 4, unlike the shift register 131, the level shifter 135 may be independently configured as an IC or may be included in the power supply 180. However, this is merely an example and the present disclosure is not limited thereto.

As shown in FIG. 5, the display panel 150 comprises a display area AA and a non-display area NA. Shift registers 131*a* and 131*b* outputting gate signals in the gate-in-panel type gate driver may be disposed in a non-display area NA of the display panel 150. The shift registers 131*a* and 131*b* may be formed as a thin film on the display panel 150 in a gate-in-panel structure. Although an example in which the shift registers 131*a* and 131*b* are disposed in the left and right non-display areas NA is illustrated, the present disclosure is not limited thereto.

Figure 6:
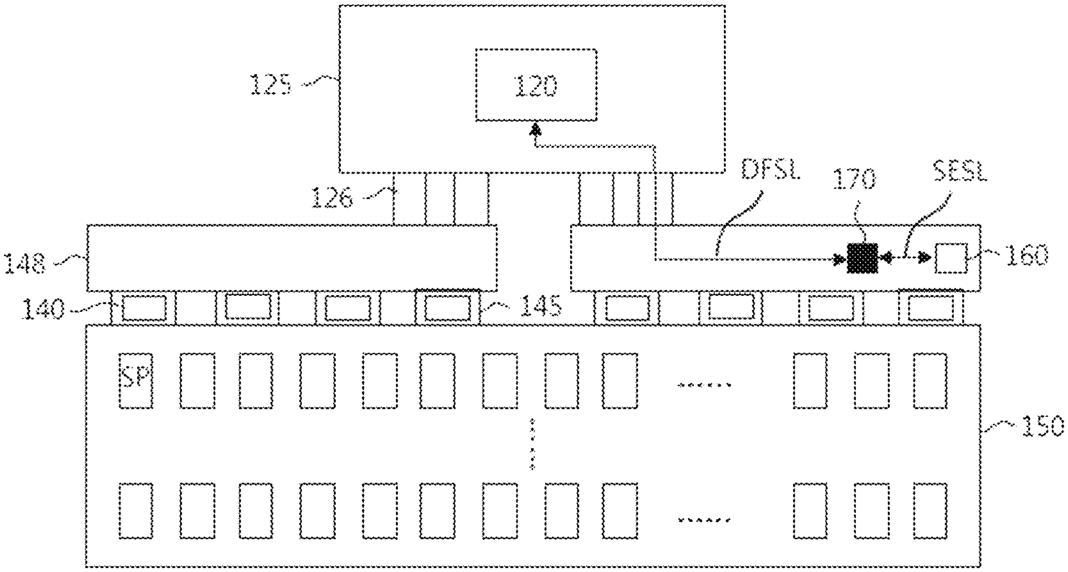
FIG. 6 is a module configuration diagram of a light emitting display device according to a first aspect of the present disclosure.
Figure 7:
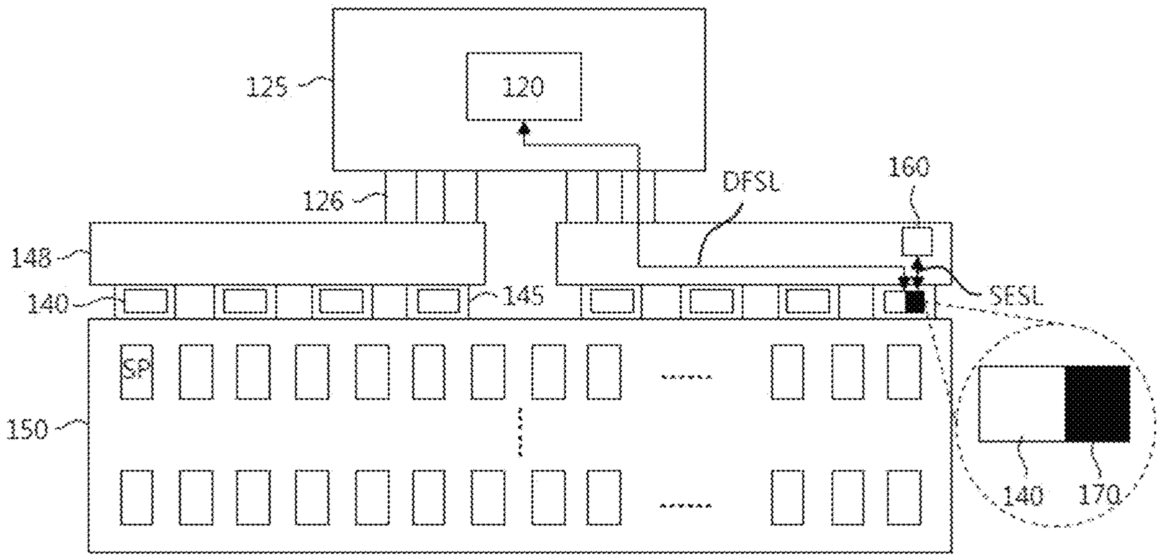
FIG. 7 is a module configuration diagram of a light emitting display device according to a second aspect of the present disclosure.

FIG. 6 is a module configuration diagram of a light emitting display device according to a first aspect of the present disclosure, and FIG. 7 is a module configuration diagram of a light emitting display device according to a second aspect of the present disclosure.

As shown in FIGS. 6 and 7, the display panel 150 may have a plurality of sub-pixels SP. A plurality of data drivers 140 may be respectively mounted on a plurality of flexible printed circuit boards 145. The plurality of flexible printed circuit boards 145 may be connected to a plurality of printed circuit boards 148. The timing controller 120 may be mounted on a main board 125. The main board 125 and the plurality of printed circuit boards 148 may be electrically connected by a connector (or a cable) 126.

According to the first aspect, a memory 160 and a data transmission/reception circuit 170 may be disposed on one of the plurality of printed circuit boards 148. According to the second aspect, the memory 160 may be disposed on one of the plurality of printed circuit boards 148, and the data transmission/reception circuit 170 may be embedded in the data driver 140 adjacent to the memory 160.

According to the first and second aspects, the data transmission/reception circuit 170 is configured between the timing controller 120 and the memory 160 to implement a NAND On Source PCB (NSP) structure capable of allowing long-range communication. The NSP structure can allow long-range data transmission/reception between the timing controller 120 and the memory 160 to increase a degree of freedom at the time of assembling and modularizing the device. In addition, according to the NSP structure, it is possible to overcome the disadvantage of having to replace the memory 160 disposed adjacent to the timing controller 120 in case of failure of the timing controller 120 formed on the main board 125. Further, the NSP structure can allow separate packaging of the main board 125 and other assemblies, thereby reducing packaging costs and logistics costs.

The memory 160 may be selected as an embedded NAND flash memory (e-MMC) or the like. The data transmission/reception circuit 170 may serve as a kind of data relay for allowing long-range data transmission/reception between the timing controller 120 and the memory 160.

The data transmission/reception circuit 170 may provide a bidirectional data transmission/reception path through which data can be transmitted and received through a first communication line DFSL coupled to the timing controller 120 and a second communication line SESL coupled to the memory 160. The data transmission/reception circuit 170 may be implemented based on a differential buffer.

The first communication line DFSL may be selected as a differential signal line through which long-range data transmission/reception can be performed, and the second communication line SESL may be selected as a signal line through which short-range data transmission/reception can be performed unlike the first communication line DFSL. The second communication line SESL may vary according to a method of transmitting/receiving data to/from the memory.

Meanwhile, the memory 160 may store compensation data for compensating for deterioration of elements (e.g., driving transistors, organic light emitting diodes, etc.) included in the display panel 150 and initial compensation data (initial values before deterioration) of elements (driving transistors, organic light emitting diodes, etc.), and the like.

FIGS. 6 and 7 shows an example in which the flexible circuit boards 145, the printed circuit boards 148, the connector 126, and the main board 125 are connected to the display panel 150. However, this is merely an example, and a circuit board or a flexible board may be further added therebetween depending on the size of the light emitting display device. In addition, the first communication line DFSL connecting the timing controller 120 and the data transmission/reception circuit 170 may be provided as a separate cable.

Figure 8:
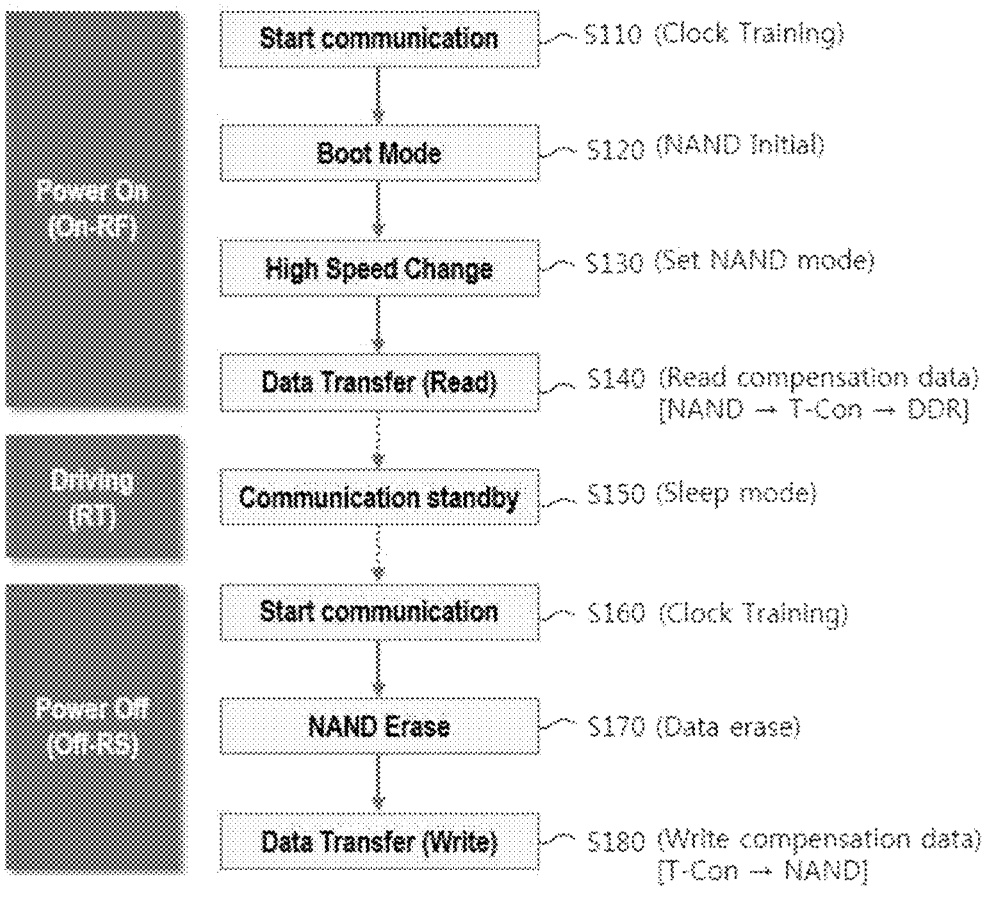
FIG. 8 is a diagram for briefly describing a flow related to data transmission/reception of a light emitting display device according to an aspect of the present disclosure.
Figure 9:
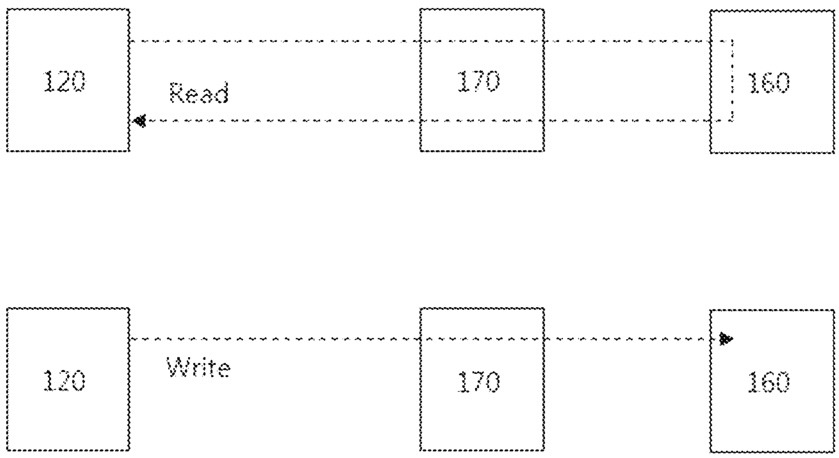
FIG. 9 is a diagram for describing a read operation and a write operation of a memory according to an aspect of the present disclosure.
Figure 10:
FIG. 10 is a diagram for briefly describing a protocol for performing the operations shown in FIG. 9.
Figure 10:
Figure 11:
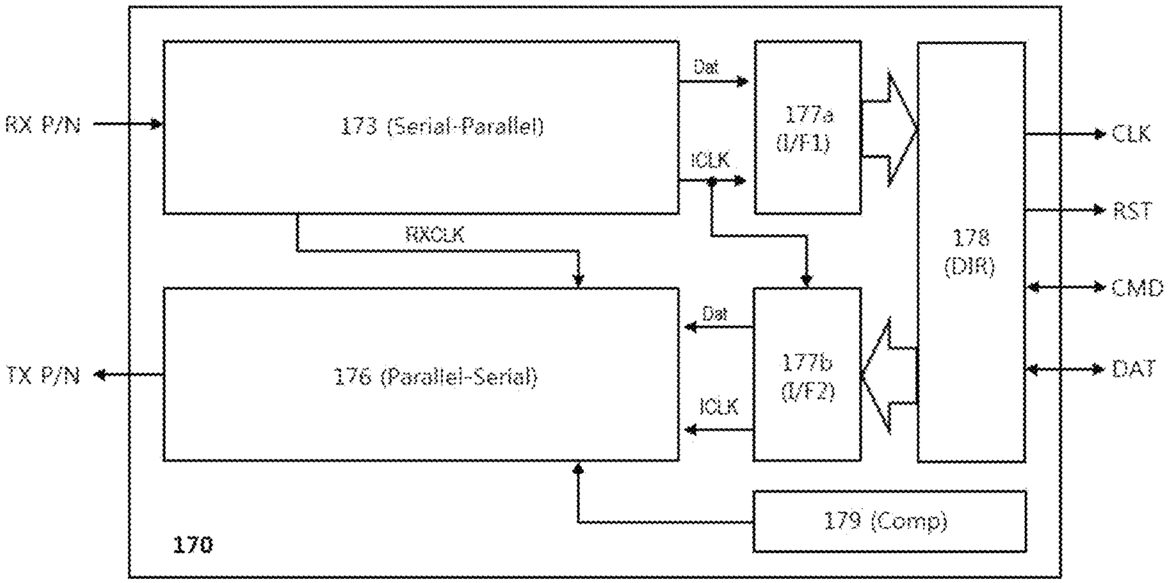
FIG. 11 is a block diagram for briefly describing a data transmission/reception circuit according to an aspect of the present disclosure.

FIG. 8 is a diagram for briefly describing a flow related to data transmission/reception of a light emitting display device according to an aspect of the present disclosure, FIG. 9 is a diagram for describing a read operation and a write operation of a memory according to an aspect of the present disclosure, FIG. 10 is a diagram for briefly describing a protocol for performing the operations shown in FIG. 9, and FIG. 11 is a block diagram for briefly describing a data transmission/reception circuit according to an aspect of the present disclosure.

As shown in FIG. 8, the light emitting display device according to the aspect of the present disclosure may perform a process of reading and writing compensation data stored in a memory NAND in order to compensate for elements included in the display panel.

When the light emitting display device is turned on (power on (On-RF)), clock training and communication with the memory may be started in to define a communication line for communication with the memory (S110). Next, a boot mode for memory initialization (NAND Initial) may be executed (S120).

Next, the communication speed may be changed to a high speed for setting a memory mode (NAND mode) (S130). Then, after the compensation data stored in the memory is read to the timing controller (T-Con), data transfer (data read) may be performed to load the compensation data into a frame memory (DDR) (S140).

When the above steps are completed, driving (RT) or real-time sensing of the display panel is performed, and thus a device related to the memory may switch to a sleep mode and enter a communication standby state (S150).

When the light emitting display device is turned off (Power Off (Off-RS)), communication with the memory may be started along with clock training in order to define a communication line for communication with the memory (S160). Next, memory erase (NAND erase) may be performed to erase unnecessary data stored in the memory (S170).

Next, data transfer (data write) may be performed to obtain new compensation data and to write the compensation data obtained by the timing controller to the memory (S180).

As shown in FIG. 9, the timing controller 120 may perform an operation of reading data stored in the memory 160 and an operation of writing data to the memory 160 in association with the data transmission/reception circuit 170, as described above.

At the time of performing a read operation for reading data stored in the memory 160, the timing controller 120 may output a request signal for transmitting a command signal and a data signal to the data transmission/reception circuit 170. In addition, at the time of performing a write operation for writing data to the memory 160, the timing controller 120 may output a request signal for performing clock training to the data transmission/reception circuit 170.

As shown in FIG. 10, in order for the timing controller 120 to access the data transmission/reception circuit 170, a first protocol composed of a request signal REQ, a clock signal CLK, a reset signal RST, a command signal CMD, a data signal D0 to D7, and the dummy signal DMY may be used.

In order for the data transmission/reception circuit 170 to access the timing controller 120, a second protocol composed of the request signal REQ, a low signal L, the command signal CMD, the data signal D0 to D7, and the dummy signal DMY may be used.

Formats of the first protocol and the second protocol may be defined in the timing controller 120, and the data transmission/reception circuit 170 may perform an operation corresponding thereto to write data to the memory or read data therefrom.

Although an example in which the data signal D0 to D7 is an 8-bit signal has been described above, this is merely an example. Accordingly, the bits of the data signal are not indicated below.

As shown in FIG. 11, the data transmission/reception circuit 170 may include a first data format converter (serial-parallel) 173, a first interface (I/F1) 177*a*, a second data format converter (parallel-serial) 176, a second interface (I/F2) 177*b*, a transmission direction setting unit (DIR) 178, and a clock compensator (Comp) 179.

The first data format converter 173 may receive signals transmitted from the timing controller (or a first external device) through a first differential signal line RX P/N. The first data format converter 173 may convert a serial data signal transmitted from the timing controller into a parallel data signal and output the converted signal.

The first data format converter 173 may generate an interface clock signal ICLK necessary to drive the first interface 177*a* and the second interface 177*b* based on a first reception clock signal RXCLK extracted from a signal transmitted from the timing controller. When the interface clock signal ICLK necessary to drive the first interface 177*a* and the second interface 177*b* is generated based on the first reception clock signal RXCLK extracted from the signal transmitted from the timing controller in this manner, it is not necessary to receive an additional clock signal and thus an additional clock signal line can be omitted.

The first interface 177*a* may be defined as a reception interface. The first interface 177*a* may configure a data signal DAT to be transmitted to the memory based on the interface clock signal ICLK and a data signal Dat output from the first data format converter 173. The first interface 177*a* may output not only the data signal DAT but also a clock signal CLK, a reset signal RST, and a command signal CMD for data transmission/reception to/from the memory. Here, the command signal CMD may be received from the timing controller, and at least one of the clock signal CLK and the reset signal RST may be received from the timing controller or may be generated by the first interface 177*a*.

The second data format converter 176 may transmit a signal to the timing controller through a second differential signal line TX P/N. The second data format converter 176 may convert a parallel data signal transmitted from the memory (or a second external device) into a serial data signal.

The second interface 177*b* may be defined as a transmission interface. The second interface 177*b* may configure a data signal to be transmitted to the timing controller based on the interface clock signal ICLK output from the first data format converter 173.

The clock compensator 179 may compensate for a clock signal for clock training such that a specific operation can be performed between the data transmission/reception circuit 170 and the timing controller.

The transmission direction setting unit 178 may set a transmission direction in which the clock signal CLK and the reset signal RST generated from the first interface 177*a* are output and the data signal DAT is transmitted to the memory or received from the memory. The transmission direction setting unit 178 may serve to set a transmission/reception path depending on a data transmission period or a data reception period in order to avoid collision between input and output during transmission/reception of the command signal (CMD) and the data signal (DAT).

The operation of the transmission direction setting unit 178 may be selected as a write mode for writing data to the memory or a read mode for reading data stored in the memory in response to the command signal CMD. For example, the transmission direction setting unit 178 may set a transmission/reception path depending on a data transmission period or a data reception period in response to a request signal including the command signal (CMD) or the like.

Hereinafter, the data transmission/reception circuit according to an aspect of the present disclosure will be described in more detail focusing on a more detailed configuration and operation.

Figure 12:
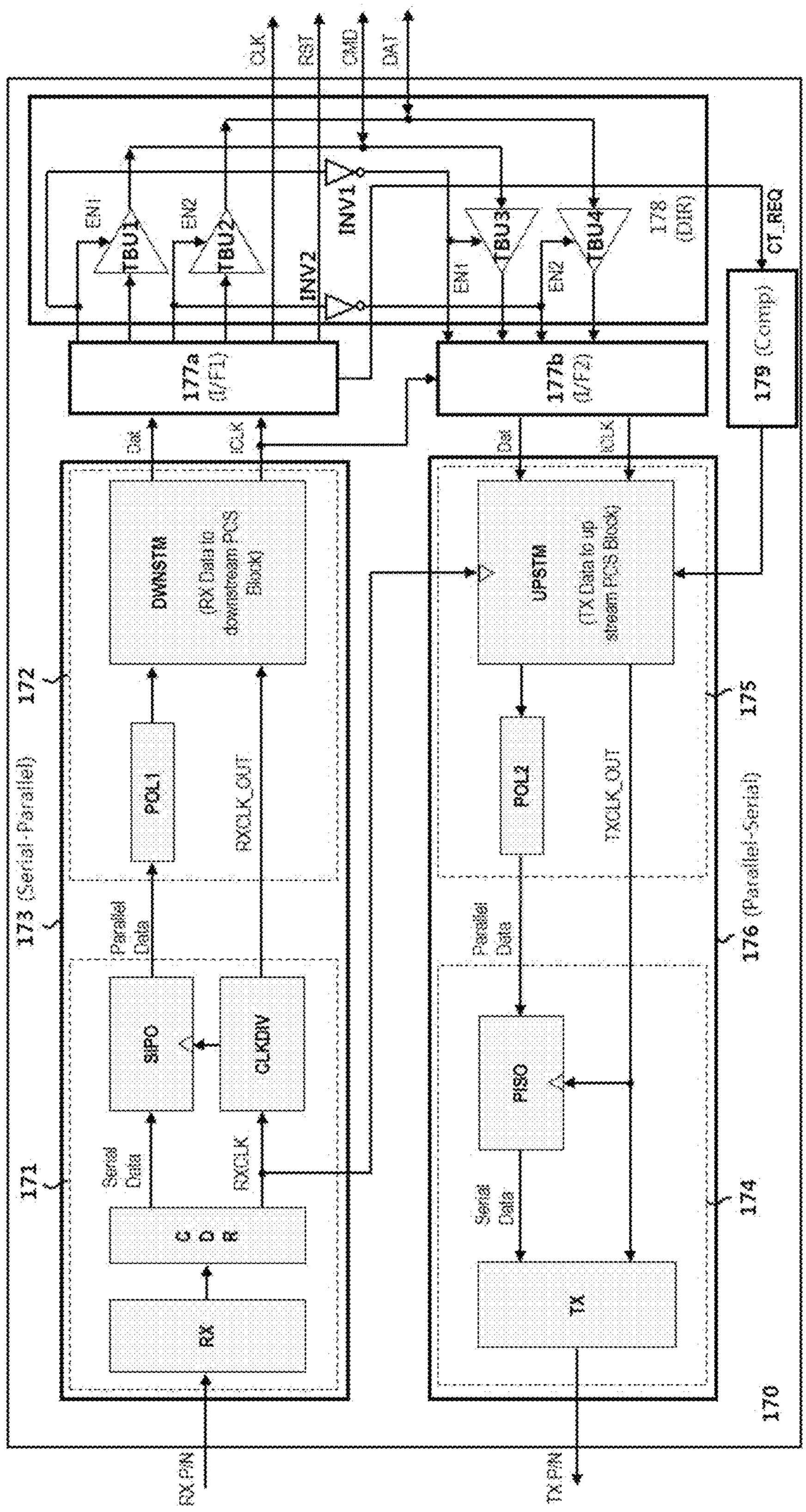
FIG. 12 is a block diagram for describing the data transmission/reception circuit according to the aspect of the present disclosure in more detail.
Figure 13:
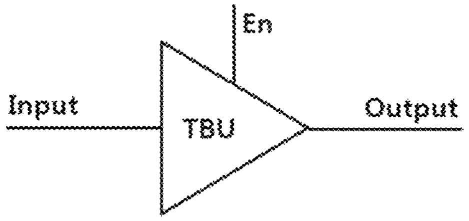
FIG. 13 is a diagram showing symbols and a truth table of tri-state buffers included in a transmission direction setting unit.
Figure 14:
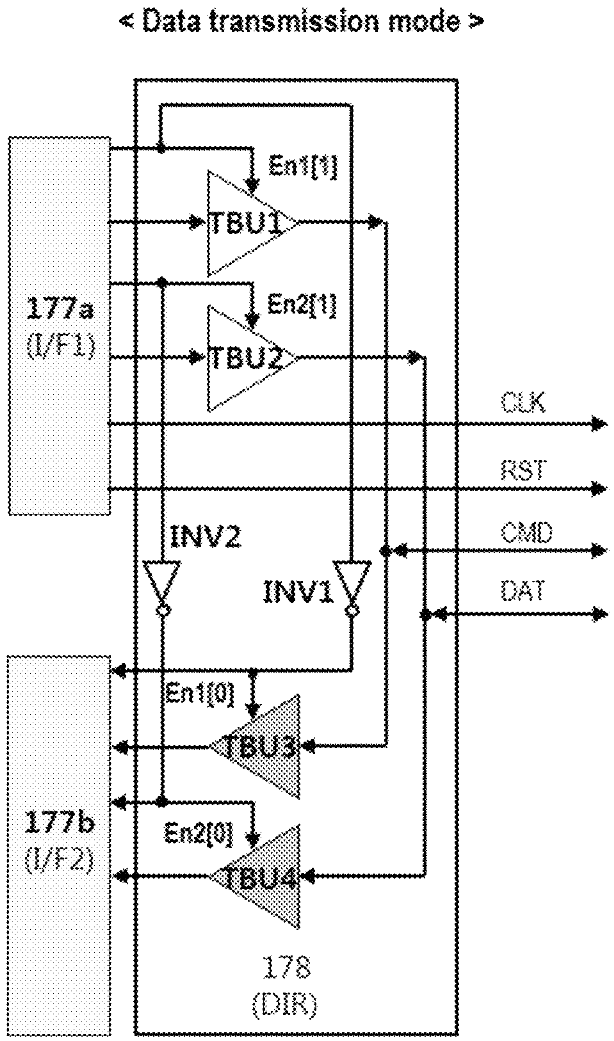
FIGS. 14 and 15 are diagrams showing modes according to operation states of the tri-state buffer.
Figure 15:
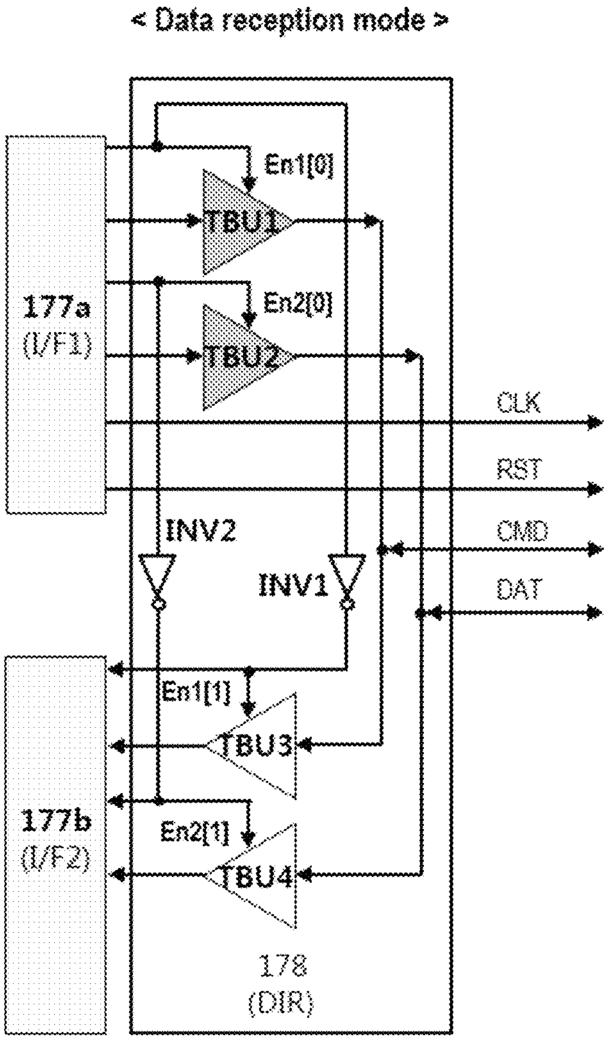

FIG. 12 is a block diagram for describing the data transmission/reception circuit according to the aspect of the present disclosure in more detail, FIG. 13 is a diagram showing symbols and a truth table of tri-state buffers included in the transmission direction setting unit, and FIGS. 14 and 15 are diagrams showing modes according to operation states of the tri-state buffers.

As shown in FIG. 12, the first data format converter 173 may include a (1-1)-th data format converter 171 including a data receiver RX, a signal restoration unit CDR, a first signal converter SIPO, and a clock divider CLKDIV, and a (1-2)-th data format converter 172 including a first polarity controller POL1 and a downstreaming unit DWNSTM.

The second data format converter 176 may include a (2-1)-th data format converter 174 including a data transmitter TX and a second signal converter PISO, a (2-2)-th data format converter 175 including a second polarity controller POL2 and an upstreaming unit UPSTM.

The data receiver RX may serve to receive a signal transmitted from the timing controller through the first differential signal line RX P/N. The data receiver RX may include and set an equalizer for improving consistency and minimizing noise during data transmission/reception to/from the timing controller.

The signal restoration unit CDR may serve to extract (separate) and restore a clock signal and a serial data signal from a signal transmitted from the data receiver RX. The serial data signal output from the signal restoration unit CDR may be transmitted to the first signal converter SIPO, and the first reception clock signal RXCLK may be transmitted to the clock divider CLKDIV. Further, the first reception clock signal RXCLK output from the signal restoration unit CDR may be transmitted to the upstreaming unit UPSTM.

The first signal converter SIPO may serve to convert the serial data signal output from the signal restoration unit CDR into a parallel data signal.

The clock divider CLKDIV may serve to generate a second reception clock signal RXCLK_OUT for driving the first signal converter SIPO and the downstreaming unit DWNSTM based on the first reception clock signal RXCLK output from the signal restoration unit CDR. The clock divider CLKDIV may include a clock divider circuit to divide a clock signal based on the first reception clock signal RXCLK to generate the second reception clock signal RXCLK_OUT.

The first polarity controller POL1 may serve to control the polarity of the parallel data signal output from the first signal converter SIPO. Since the parallel data signal output from the first signal converter SIPO is generated and received based on a differential signal, the first polarity controller POL1 may serve to remove the polarity imparted to the parallel data signal.

The downstreaming unit DWNSTM (RX data to downstream PCS block) may perform data decoding for downstreaming the parallel data signal output from the first polarity controller POL1 to obtain a data format that can be transmitted to the memory. The downstreaming unit DWNSTM may decode a data signal Dat in accordance with the clock signal CLK. The downstreaming unit DWNSTM may include an 8-bit or 10-bit decoder to decode the data signal Dat to be transmitted.

The data transmitter TX may serve to transmit a signal transmitted from the memory to the timing controller through the second differential signal line TX P/N. The data transmitter TX may transmit a serial data signal output from the second signal converter PISO based on a transmission clock signal TXCLK_OUT output from the upstreaming unit UPSTM. The data transmitter TX may include and set a pre-emphasis for increasing data transmission capability during data transmission/reception to/from the timing controller. The data transmitter TX may operate based on the clock signal output from the clock divider CLKDIV such that data transmission that matches the transmission speed of the second differential signal line TX P/N is performed.

The second signal converter PISO may serve to convert the parallel data signal output from the second polarity controller POL2 into a serial data signal. The second signal converter PISO converts the parallel data signal output from the second polarity controller POL2 based on the transmission clock signal TXCLK_OUT output from the upstreaming unit UPSTM into a serial data signal.

The second polarity controller POL2 may serve to control the polarity of the parallel data signal output from the upstreaming unit UPSTM. Since the parallel data signal output from the upstreaming unit UPSTM needs to be transmitted based on a differential signal, the second polarity controller POL2 may serve to assign a polarity to the parallel data signal.

The upstreaming unit UPSTM (TX data to upstream PCS block) may perform data encoding for upstreaming the parallel data signal output from the second interface **177*b*** to obtain a data format that can be transmitted to the timing controller. The upstreaming unit UPSTM may encode the data signal Dat in accordance with the clock signal CLK. The upstreaming unit UPSTM may include an 8-bit or 10-bit encoder to encode the data signal Dat to be transmitted. The upstreaming unit UPSTM may generate the transmission clock signal TXCLK_OUT for driving the data transmitter TX and the second signal converter PISO based on the first reception clock signal RXCLK transmitted from the signal restoration unit CDR and output the transmission clock signal TXCLK_OUT.

The first interface **177*a* may output the clock signal CLK, the reset signal RST, the command signal CMD and a data signal DAT for data transmission/reception to/from the memory based on the data signal Dat and the interface clock signal ICLK output from the downstreaming unit DWMSTM. The first interface 177*a* may generate a request signal CT_REQ for performing clock training. The clock training request signal CT_REQ may be generated to perform a specific irregular operation, such as a read operation, a write operation, and an erase operation, between the data transmission/reception circuit 170** and the timing controller.

The clock compensator 179 may compensate for the clock signal such that clock training can be performed in response to the clock training request signal CT_REQ output from the first interface **177*a***.

The transmission direction setting unit 178 includes a first tri-state buffer TBU1, a second tri-state buffer TBU2, a third tri-state buffer TBU3, a fourth tri-state buffer TBU4, a first inverter INV1, and a second inverter INV2. Although one second tri-state buffer TBU2 and one fourth tri-state buffer TBU4 for transmitting and receiving the data signal DAT are illustrated, a plurality of second tri-state buffers TBU2 and a plurality of fourth tri-state buffers TBU4 may be configured depending on the number of bits of the data signal DAT. For example, when the 8-bit data signal DAT is transmitted and received as described above with reference to FIG. 10, eight second tri-state buffers TBU2 and eight fourth tri-state buffers TBU4 may be provided.

The first tri-state buffer TBU1 may be enabled or disabled in response to a first enable signal output through a first enable signal line EN1 of the first interface **177*a*. When the first tri-state buffer TBU1 is enabled, the command signal CMD may be transmitted to the memory. The second tri-state buffer TBU2 may be enabled or disabled in response to a second enable signal output through a second enable signal line EN2 of the first interface 177*a***. When the second tri-state buffer TBU2 is enabled, the data signal DAT may be transmitted to the memory.

The third tri-state buffer TBU3 may be enabled or disabled in response to an inverted first enable signal output through the first inverter INV1 connected to the first enable signal line EN1. When the third tri-state buffer TBU3 is enabled, the command signal CMD may be received from the memory. The fourth tri-state buffer TBU4 may be enabled or disabled in response to an inverted second enable signal output through the second inverter INV2 connected to the second enable signal line EN2. When the fourth tri-state buffer TBU4 is enabled, the data signal DAT may be received from the memory.

As shown in FIG. 13, an operation state of a tri-state buffer TBU may be determined according to the logic of an enable signal input through an enable terminal En. When the logic of the enable signal input through the enable terminal En is 0, the tri-state buffer TBU is in an operation state in which it cannot output an input signal as an output signal such as a high impedance Hi-Z. On the other hand, when the logic of the enable signal input through the enable terminal En is 1, the tri-state buffer TBU is in an operation state in which it can output the input signal as an output signal of 0 or 1.

As shown in FIG. 14, when the data transmission/reception circuit operates in a data transmission mode, the first tri-state buffer TBU1 and the second tri-state buffer TBU2 may be enabled in response to a first enable signal En1[1] and a second enable signal EN2[1] corresponding to logic 1. On the other hand, the third tri-state buffer TBU3 and the fourth tri-state buffer TBU4 may be disabled in response to a first enable signal En1[0] and a second enable signal EN2[0] inverted by the first inverter INV1 and the second inverter INV2 and corresponding to logic 0. Accordingly, when the data transmission/reception circuit operates in the data transmission mode, only the first tri-state buffer TBU1 and the second tri-state buffer TBU2 can be in an operable state. That is, the first tri-state buffer TBU1 and the second tri-state buffer TBU2 can be defined as tri-state buffers for data transmission.

As shown in FIG. 15, when the data transmission/reception circuit operates in a data reception mode, the first tri-state buffer TBU1 and the second tri-state buffer TBU2 may be disabled in response to a first enable signal En1[0] and a second enable signal EN2[0] corresponding to logic 0. On the other hand, the third tri-state buffer TBU3 and the fourth tri-state buffer TBU4 may be enabled in response to a first enable signal En1[1] and a second enable signal EN2[1] inverted by the first inverter INV1 and the second inverter INV2 and corresponding to logic 1. Accordingly, when the data transmission/reception circuit operates in the data reception mode, only the third tri-state buffer TBU3 and the fourth tri-state buffer TBU4 can be in an operable state. That is, the third tri-state buffer TBU3 and the fourth tri-state buffer TBU4 can be defined as tri-state buffers for data reception.

Hereinafter, an example of a request signal for performing a read operation and a write operation of a memory using the data transmission circuit unit according to an aspect of the present disclosure will be described.

Figure 16:
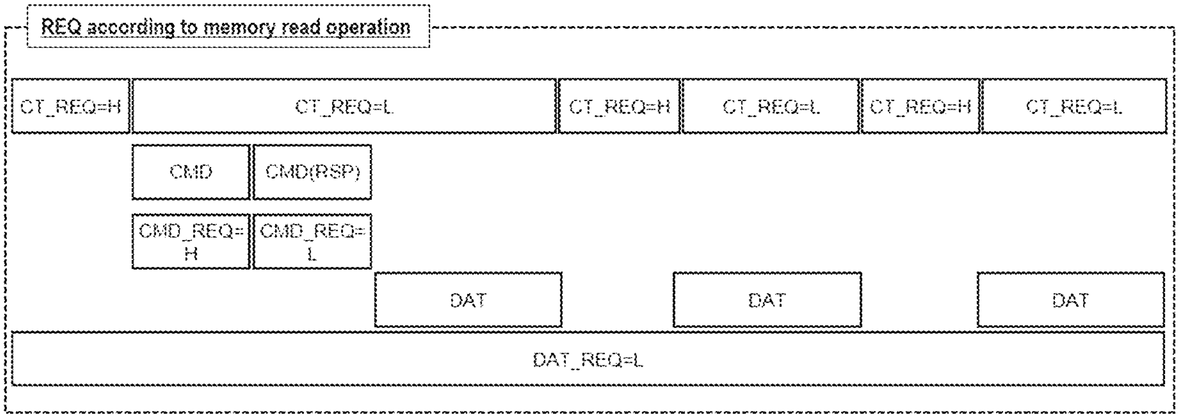
FIGS. 16 and 17 are diagrams for describing examples of request signals for performing a read operation and a write operation of a memory.
Figure 17:
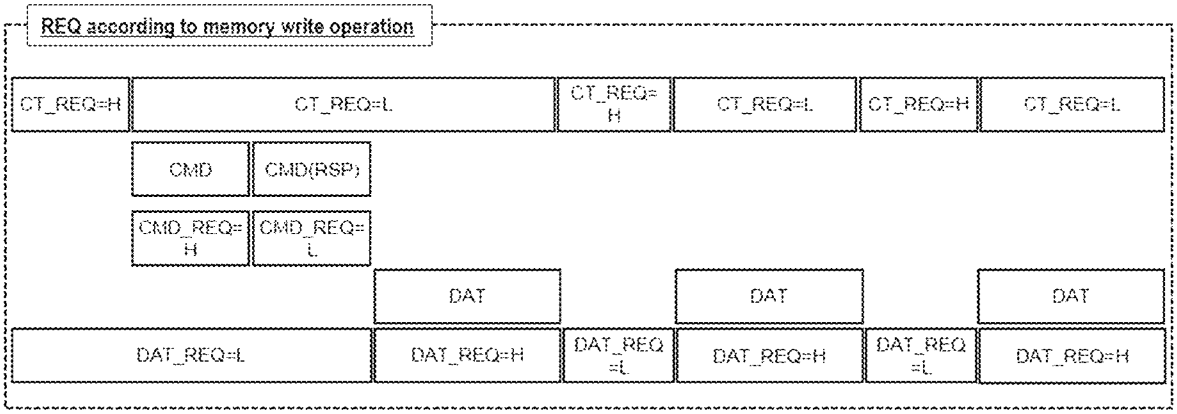

FIGS. 16 and 17 are diagrams for describing examples of request signals for performing a read operation and a write operation of a memory.

As shown in FIGS. 16 and 17, a request for performing a memory read operation (REQ according to a memory read operation) and a request for performing a memory write operation (REQ according to a memory write operation) using the data transmission circuit unit may have different forms. Requests for performing a memory read operation and a memory write operation may be generated based on a first request signal CMD_REQ, a second request signal DAT_REQ, and a third request signal CT_REQ, which will be described below.

The first request signal CMD_REQ may be used to distinguish a read operation from a write operation with respect to the command signal CMD. When the first request signal CMD_REQ is in a high state (CMD_REQ=H), the data transmission/reception circuit may transmit the command signal CMD to the memory. In this case, the data transmitting/receiving circuit may not receive the command signal from the transmission terminal of the timing controller. When the first request signal CMD_REQ is in a low state (CMD_REQ=L), the data transmission/reception circuit may not transmit the command signal CMD to the memory. In this case, the data transmission/reception circuit may receive a response command signal CMD(RSP) from the transmission terminal of the timing controller.

The second request signal DAT_REQ may be used to distinguish a read operation from a write operation with respect to the data signal DAT. When the second request signal DAT_REQ is in a high state (DAT_REQ=H), the data transmission/reception circuit may transmit the data signal DAT to the memory. In this case, since the data transmission/reception circuit is in a memory write operation state, the data transmission/reception circuit may not receive data from the transmission terminal of the timing controller. When the second request signal DAT_REQ is in a low state (DAT_REQ=L), the data transmission/reception circuit may transmit the data signal DAT to the memory (memory write operation). In this case, since the data transmission/reception circuit is in a memory read operation state, the data transmission/reception circuit may receive data from the transmission terminal of the timing controller.

The third request signal CT_REQ may be used to cause clock training to be performed between the timing controller and the data transmission/reception circuit before a read operation, a write operation, or an erase operation are performed. The third request signal CT_REQ may be used for stable communication (transmission/reception) of high-rate data. For example, when the third request signal CT_REQ is in a high state, clock training may be performed immediately.

Meanwhile, clock training may be performed not only at the time of performing a specific irregular operation such as a read operation, a write operation, and an erase operation, but also at the time of transmitting a data signal DAT to improve data transmission stability. This can be ascertained from FIG. 17 showing an example in which, whenever a second request signal DAT_REQ for transmitting a data signal Dat of one block is generated in a high state (DAT_REQ=H), it is followed by generation of a second request signal DAT_REQ in a low state (DAT_REQ=L) and generation of a third request signal CT_REQ in a high state (CT_REQ=H).

As described above, the present disclosure has the effect of realizing a device that allows long-range data transmission/reception between the timing controller and the memory and stable communication. In addition, the present disclosure has the effect of increasing a degree of freedom at the time of assembling and modularizing the device by enabling long-range data transmission/reception between the timing controller and the memory. Furthermore, the present disclosure has the effect of overcoming the inconvenience of having to replace a memory adjacent to the timing controller in case of failure of the timing controller.

What is claimed is:

1. A display device comprising:

a display panel configured to display an image;

a timing controller configured to control the display panel;

a memory configured to operate in association with the timing controller and disposed on a substrate; and a data transmission/reception circuit configured to write data into the memory or to read data from the memory under control of the timing controller, wherein the data transmission/reception circuit includes a transmission direction setting unit configured to set a data transmission/reception path depending on a data transmission period or a data reception period in order to avoid collision between input and output during data transmission/reception, wherein the data transmission/reception circuit is configured to allow long-range data transmission/reception between the timing controller and the memory, and wherein the transmission direction setting unit includes a plurality of tri-state buffers and sets the data transmission/reception path according to logic states of enable signals applied to enable terminals of the plurality of tri-state buffers, wherein the plurality of tri-state buffers includes a data transmission tri-state buffer enabled when data is transmitted, and a data reception tri-state buffer enabled when data is received, wherein the data transmission/reception circuit includes:

a first interface configured to operate to transmit a data signal transmitted from the timing controller to the memory; and a second interface configured to operate to transmit a data signal transmitted from the memory to the timing controller, wherein the enable signal is output from one of the first interface and the second interface, and wherein the data transmission/reception circuit includes:

a first data format converter configured to receive signals transmitted from the timing controller, to convert a serial data signal from among the signals transmitted from the timing controller into a parallel data signal, and to output the parallel data signal; and a second data format converter configured to receive signals transmitted from the memory, to convert a parallel data signal from among the signals transmitted from the memory into a serial data signal, and to output the serial data signal.

2. The display device of claim 1, wherein the second data format converter is configured to convert the parallel data signal into the serial data signal based on a clock signal output from the first data format converter.

3. The display device of claim 1, wherein the timing controller and the data transmission/reception circuit are configured to perform clock training when irregular operations including a read operation, a write operation, and an erase operation of the memory are performed.

4. The display device of claim 1, further comprising:

a first communication line positioned between the timing controller and the data transmission/reception circuit; and a second communication line positioned between the data transmission/reception circuit and the memory, wherein the first communication line is selected as a differential signal line capable of allowing long-range data transmission and reception.

* * * * *